United States Patent
Doemens et al.

[11] Patent Number: 6,084,368
[45] Date of Patent: Jul. 4, 2000

[54] ARRANGEMENT FOR THE CONTACTLESS INDUCTIVE TRANSMISSION OF ELECTRIC MEASUREMENT VALUES AND/OR ELECTRIC ENERGY BETWEEN A ROTOR AND A STATOR

[75] Inventors: Günter Doemens, Holzkirchen; Markus Gilch, Mauern, both of Germany

[73] Assignee: Siemens Aktiengesellschaft, Munich, Germany

[21] Appl. No.: 09/202,160

[22] PCT Filed: Jun. 18, 1997

[86] PCT No.: PCT/DE97/01248

§ 371 Date: Dec. 9, 1998

§ 102(e) Date: Dec. 9, 1998

[87] PCT Pub. No.: WO97/49996

PCT Pub. Date: Dec. 31, 1997

[30] Foreign Application Priority Data

Jun. 24, 1996 [DE] Germany ............... 196 25 160

[51] Int. Cl.[7] ........................................... H02P 1/00
[52] U.S. Cl. ................... 318/493; 318/660; 318/661; 318/606; 318/541
[58] Field of Search ................... 318/660, 661, 318/493, 541, 606; 73/862.33

[56] References Cited

U.S. PATENT DOCUMENTS

| 4,511,884 | 4/1985 | Serev et al. ............... 318/660 |
| 4,941,363 | 7/1990 | Doemens . | |

FOREIGN PATENT DOCUMENTS

| 0 712 105 A2 | 5/1996 | European Pat. Off. . |
| 41 16 085 A1 | 11/1992 | Germany . |
| 42 36 420 A1 | 5/1993 | Germany . |
| 43 28 600 A1 | 3/1995 | Germany . |

OTHER PUBLICATIONS

DE–Z messen + prüfen, Jun. 1969, H. Kubach, Ein induktiver Messwertgeber für Weg—und Winkelmessungen, pp. 421–422.

*Primary Examiner*—Karen Masih
*Attorney, Agent, or Firm*—Hill & Simpson

[57] ABSTRACT

The known arrangements have at least one rotor coil (RS) arranged on the rotor and at least one stator coil (SS) arranged on the stator. The rotor coil (RS) and the stator coil (SS) respectively have at least one winding (WI) and there is a magnetic coupling between the rotor coil (RS) and the stator coil (SS). With an arrangement of this sort, it is possible for example to transmit measurement signals of a measurement pickup (MA) arranged on the rotor (RO) for the contactless measurement of torques. The additional acquisition of the respective angular position and/or of the respective angular speed ($\omega$) of the rotor RO is enabled, without additional outlay, in that the winding (WI) of the conductor that forms the rotor coil (RS) or the stator coil (SS) is structured locally, and preferably also periodically, over the entire extent of the winding (WI) by modifications of shape and/or material, in such a way that there results a fluctuation, which is periodic if warranted, of the magnetic coupling factor (KG).

The respective angular position and/or the respective angular speed ($\omega$) of the rotor (RO) can be derived from the resulting fluctuations of the amplitude (AM) of a time-modulated or, respectively, frequency-modulated measurement signal, or from the resulting fluctuations of the transmitted energy.

15 Claims, 2 Drawing Sheets

ARRANGEMENT FOR THE CONTACTLESS INDUCTIVE TRANSMISSION OF ELECTRIC MEASUREMENT VALUES AND/OR ELECTRIC ENERGY BETWEEN A ROTOR AND A STATOR

BACKGROUND OF THE INVENTION

The invention relates to an arrangement for the contactless inductive transmission of electrical measured quantities and/or electrical energy between a rotor and a stator, having at least one rotor coil arranged on the rotor, with at least one winding;

at least one stator coil arranged on the stator, with at least one winding;

whereby there is a magnetic coupling between the rotor coil and the stator coil.

The contactless, precise measurement of the emitted moment of torque, and thereby of the mechanical power on rotating shafts, is today one of the most pressing sensor technology problems in energy and automation engineering. The areas of application are in the monitoring and controlling of drives, as well as in optimization of the efficiency of energy conversion apparatuses. From European reference EP-B-0 354 386, a measurement pickup with a capacitive transducer for contactless measurement of torques on rotating shafts is known that, with low manufacturing costs and a small axial space requirement, can acquire the moment transmitted via the shaft, and thereby also the mechanical power, with a precision of less than 1%, and emits an electrical signal proportional to the torque.

For the contactless measurement of the torque, in general coil systems consisting of a rotor coil and a stator coil are provided via which the measurement signal and/or the electrical energy for the sensor or, respectively, the measurement pickup are transmitted. In the corresponding rotating inductive transmission systems, it is known and is technologically obvious to derive a signal for the RPM from the field non-homogeneity in the area of the current feed.

From German reference DE-A-41 16 085, a method is known for cyclically absolute path measurement in a rotating shaft, in which the phase windings of a rotary current synchronous motor that drives the shaft via its rotor are fed with, in addition to the feed voltages that furnish the motor power, a reference signal of a different frequency. The inductance fluctuations at the individual windings, caused by the rotation of the rotor, and the fluctuations caused thereby of the measurement signal amplitude are acquired, are separated from the actual reference signal frequency using standard demodulation and filter means, and from them two sine oscillations phase-displaced by 90° in relation to one another are produced that identify the respective position of the rotor and thus of the shaft. By this means, an additional resolver or similar angular measurement unit to be coupled with the shaft can be saved. However, a simultaneous transmission of the electrical measured quantities of a sensor or measurement pickup arranged on the shaft is not possible with an arrangement of this sort.

SUMMARY OF THE INVENTION

The invention is based on the problem of realizing a high-resolution angular rotary transducer in an arrangement of this species, for the contactless inductive transmission of electrical measured quantities and/or electrical energy between a rotor and a stator, without additional outlay, and thereby to enable a precise acquisition of the respective angular position and/or of the respective angular speed of the rotor.

This object is solved according to the invention in that the conductor that forms the winding of the rotor coil or of the stator coil is locally structured, by means of modifications of shape and/or material, over the entire extent of the winding in such a way that a fluctuation of the magnetic coupling factor results, and in that the respective angular position and/or the respective angular speed of the rotor can be derived from the resulting fluctuations of the amplitude of a time-modulated or, respectively, frequency-modulated measurement signal, or from the resulting fluctuations of the transmitted energy.

Advantageous developments of the present invention are as follows.

the conductor that forms the winding of the rotor coil or of the stator coil is locally and periodically structured over the entire extent of the winding by means of modifications of shape and/or of material, such that a periodic fluctuation of the magnetic coupling factor results.

Alternatively, the conductor that forms the winding of the rotor coil is or of the stator coil is locally and periodically structured over the entire extent of the winding such that a periodic and constant fluctuation of the magnetic coupling factor results.

A circuit board is arranged on the rotor, on which the rotor coil is formed in planar technology.

A circuit board is arranged on the stator, on which the stator coil is formed in planar technology.

The radius of the winding of the rotor coil has periodic fluctuations over the entire extent of the winding.

The radius of the winding of the stator coil has periodic fluctuations over the entire extent of the winding.

The cross-section of the conductor that forms the winding of the rotor coil has periodic fluctuations over the entire extent of the winding.

The cross-section of the conductor that forms the winding of the stator coil has periodic fluctuations over the entire extent of the winding.

Over the entire extent of the winding, the conductor that forms the winding of the rotor coil periodically has regions having a material with high magnetic permeability.

Over the entire extent of the winding, the conductor that forms the winding of the stator coil periodically has regions having a material with high magnetic permeability.

The geometrical dimension of the stator coil is matched to the periodicity of the structuring of the winding of the rotor coil.

The diameter of the stator coil corresponds approximately to the fluctuations of the radius of the winding of the rotor coil.

The geometrical dimension of the rotor coil is matched to the periodicity of the structuring of the winding of the stator coil.

The diameter of the rotor coil corresponds approximately to the fluctuations of the radius of the winding of the stator coil.

The arrangement is used for contactless transmission to a stator of electrical measured quantities and/or electrical energy of a measurement pickup or sensor arranged on a rotor, and for simultaneous determination of the respective angular position and/or the respective angular speed of the rotor.

The inventive construction of the stator coil or of the rotor coil, with local and preferably also periodic modifications of shape and material, enables, without any additional expense, a use of the arrangement as a high-resolution angular rotary transducer according to the principle of incremental inductive angular measurement. In an arrangement for contactless measurement of torques on rotating shafts, or given arbitrary other inductive transmission systems for the electrical measured quantities of a sensor or measurement pickup arranged on a shaft, the respective angular speed of the shaft or, respectively, of the rotor can thus be determined simultaneously, whereby resolutions of for example 240 impulses per rotation of the shaft can be achieved unproblematically.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

Figure 1:
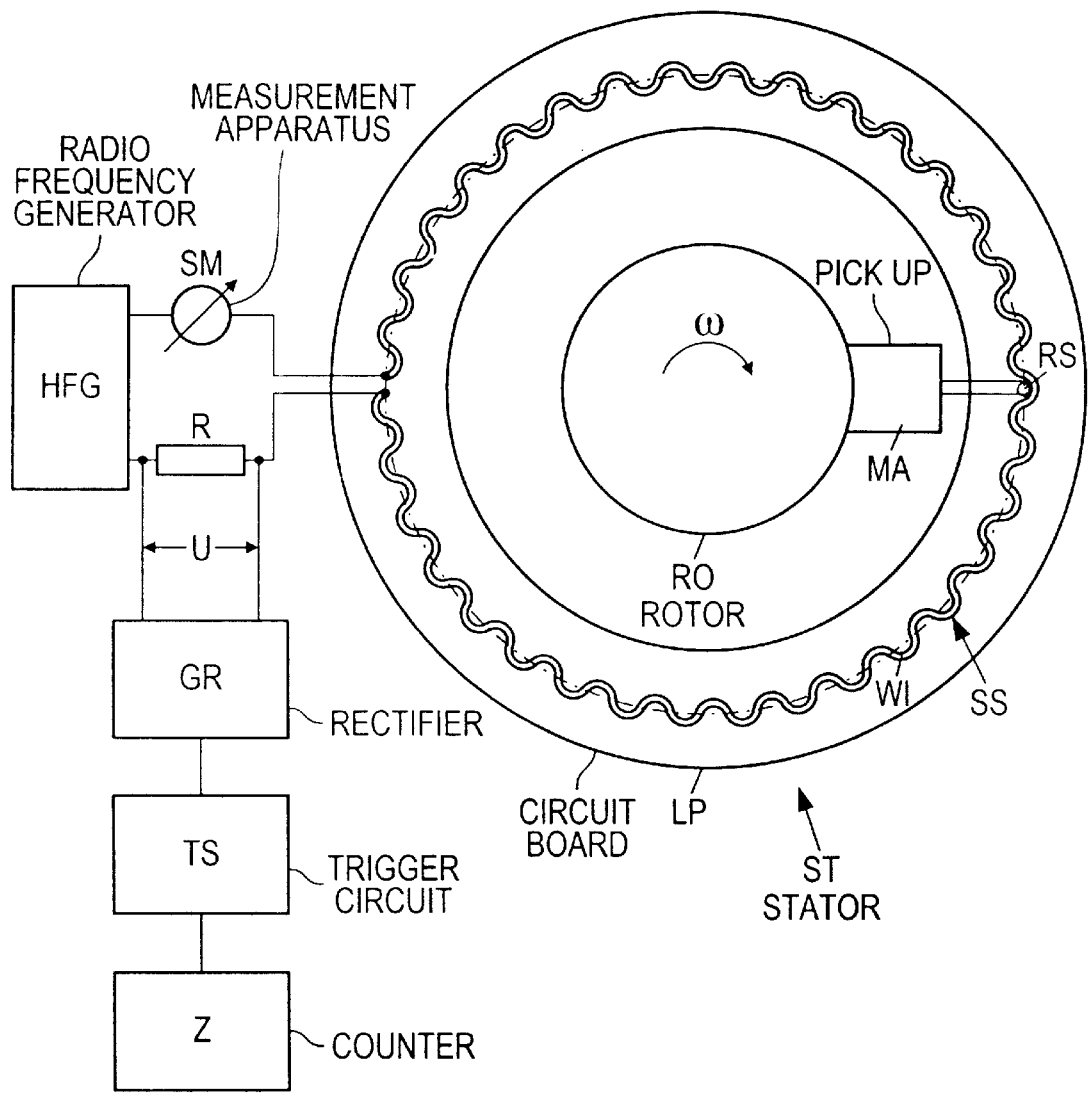
FIG. 1 shows, in a highly simplified schematic drawing, a measurement pickup for the contactless measurement of the torque at a rotor and an arrangement for the contactless inductive transmission of the measurement signal from the rotor to a stator and/or of electrical energy from the stator to the rotor.

FIG. 1 shows a highly simplified schematic representation of a measurement pickup MA arranged on a rotor RO for the contactless measurement of the torque at the rotor RO and an arrangement for the contactless inductive transmission of the measurement signal emitted by the measurement pickup MA to a stator ST. The measurement pickup MA, indicated only schematically, is a measurement pickup with a capacitive transducer, known from EP-B-0 354 386.

The arrangement for the contactless transmission of the measurement signal from the rotor RO to the stator ST and/or of electrical energy from the stator ST to the rotor RO comprises a rotor coil RS arranged on the rotor RO and a stator coil SS. The stator coil SS, consisting of a single winding WI with a current feed, is formed in planar technology on a circuit board LP connected with the stator ST. The rotor coil RS is arranged on the rotor RO in such a way that there is a magnetic coupling with the stator coil SS. It can be seen that the diameter of the rotor coil RS is considerably smaller than that of the stator coil. The ratio of the diameter of the rotor coil RS and the stator coil SS is for example 1:60.

The supply of energy to the electronics of the measurement pickup MA arranged on the rotor RO takes place via a radio-frequency generator HFG that is connected to the current feed of the stator coil SS, whereby a current measurement apparatus SM is connected in the connection line, while a resistor R is connected in the other connection line. The voltage U adjacent to both sides of this resistor R is supplied to a rectifier GR, after which are arranged a trigger circuit TS and a counter Z.

Figure 2:
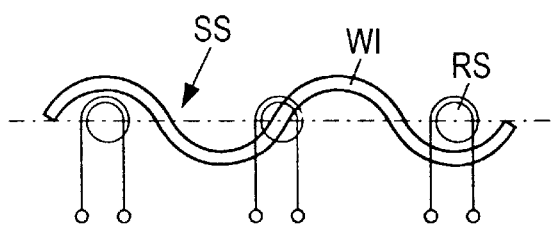
FIG. 2 shows the design of the periodic modification of the radius of the winding of the stator coil of the arrangement according to FIG. 1 for the modulation of the coupling factor.

With the arrangement described above, besides the inductive transmission of the measurement signal and/or electrical energy, a precise acquisition of the angular speed ω of the rotor RO is supposed to be enabled. For this purpose, the stator coil SS is structured in its geometrical shape in such a way that the radius of the winding WI comprises periodic fluctuations over the entire extent of the winding WI. From FIG. 1, and in particular from FIG. 2, it can be seen that the radius of the winding WI of the stator coil SS changes periodically by approximately the diameter of the rotor coil RS. FIG. 2 thereby shows three different successive phase positions of the rotor coil RS in the region of the largest and of the smallest diameter of the stator coil SS and in the region of a middle position.

Figure 3:
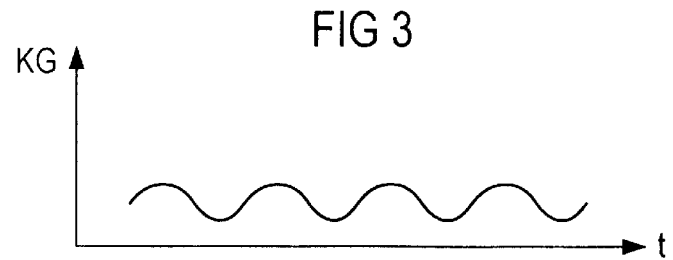
FIG. 3 shows the fluctuations of the coupling factor caused by the shape modifications.
Figure 4:
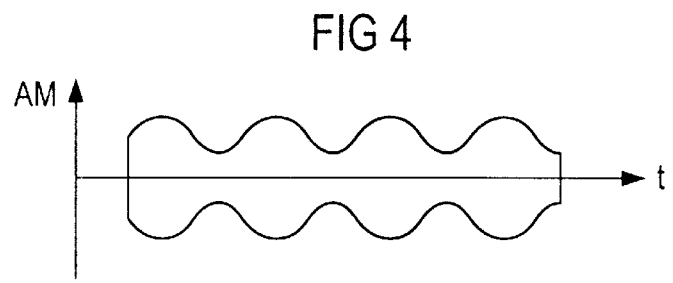
FIG. 4 shows the fluctuations of the amplitude of a time- or, respectively, frequency-modulated measurement signal resulting from the fluctuations of the coupling factor according to FIG. 2.
Figure 5:
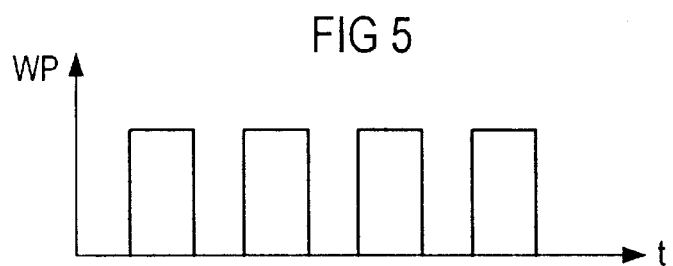
FIG. 5 shows the angular impulses corresponding to the amplitude fluctuations according to FIG. 4.

The shape modifications of the stator coil SS, visible from FIGS. 1 and 2, lead to a periodic and constant fluctuation of the coupling factor KG, whereby these fluctuations are plotted over time in FIG. 3. The fluctuations of the amplitude AM of the voltage U adjacent to the resistor R (cf. FIG. 1) are shown in FIG. 4. After rectification and triggering, the angle impulses shown in FIG. 5 result. With the aid of the counter Z (FIG. 1), arranged after the rectifier GR and after the trigger circuit TS, the front and rear edges of the angle impulse WP are then for example acquired, i.e., a high-resolution angular rotary transducer is realized that supplies for example 240 impulses per rotation of the rotor RO without interpolation. In this embodiment, the diameter of the stator coil SS was 20 cm, while the diameter of the rotor coil RS was 6 mm.

Figure 6:
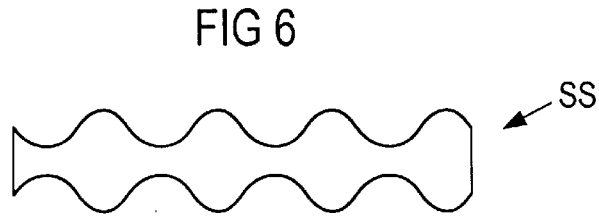
FIG. 6 shows a first variant for the modulation of the coupling factor with a periodic and local structuring of the conductor of the stator coil by means of cross-sectional modifications.

FIG. 6 shows a first variant for the modulation of the coupling factor KG (cf. FIG. 3) with a periodic and local structuring of the conductor of the stator coil SS by modifications of the cross-section.

Figure 7:
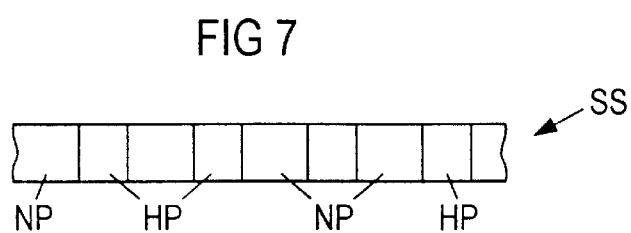
FIG. 7 shows a second variant for the modulation of the coupling factor with a periodic and local structuring of the conductor of the stator coil by means of modifications of material.

FIG. 7 shows a second variant for the modulation of the coupling factor KG (cf. FIG. 3) with a periodic and local structuring of the conductor of the stator coil SS by modifying the material. Here, seen in the longitudinal direction of the conductor, regions NP, having a material of low or normal magnetic permeability, alternate with regions HP, having a material with high magnetic permeability. The same effect could also be achieved by the periodic attachment of small magnetic shoes to the conductor that forms the stator coil SS.

Differing from the above-described embodiments, the fluctuations shown in FIG. 3 of the coupling factor KG can also be realized in that the rotor coil is correspondingly structured by modifications of shape and/or material. In this case, the geometrical dimension of the stator coil is then matched to the periodicity of the structuring of the rotor coil, i.e., the stator coil receives a correspondingly small diameter.

In all the possible embodiments, the additional function of a high-resolution angular rotary transducer is made possible by the fluctuations, visible in FIG. 3, of the coupling factor KG. The drop in the coupling is thereby selected small enough that the energy transmission or, respectively, measurement signal transmission is not at all adversely affected.

What is claimed is:

1. An arrangement for contactless inductive transmission of at least one of electrical measured quantities and electrical energy between a rotor and a stator comprising:

at least one rotor coil arranged on the rotor, the rotor coil having at least one winding;

at least one stator coil arranged on the stator, the stator coil having at least one winding;

a magnetic coupling between the rotor coil and the stator coil;

a conductor that forms a respective winding of one of the rotor coil and the stator coil being locally structured, by modifications of at least one of shape and material, over an entire extent of the respective winding so that a fluctuation of a magnetic coupling factor of the magnetic coupling occurs;

at least one of respective angular position and respective angular speed of the rotor being derived from resulting fluctuations of amplitude of one of a time-modulated measurement signal and a frequency-modulated measurement signal and from resulting fluctuations of transmitted energy.

2. The arrangement according to claim 1, wherein the respective conductor that forms the winding of the rotor coil or of the stator coil is locally and periodically structured over the entire extent of the respective winding by modifications of at least one of shape and material, such that a periodic fluctuation of the magnetic coupling factor results.

3. An arrangement according to claim 1, wherein the respective conductor that forms the winding of the rotor coil or of the stator coil is locally and periodically structured over the entire extent of the respective winding such that a periodic and constant fluctuation of the magnetic coupling factor results.

4. The arrangement according to claim 1, wherein the arrangement further comprises a circuit board arranged on the rotor, on which the rotor coil is formed in planar technology.

5. The arrangement according to claim 1, wherein the arrangement further comprises a circuit board arranged on the stator, on which the stator coil is formed in planar technology.

6. The arrangement according to claim 1, wherein a radius of the winding of the rotor coil comprises periodic fluctuations over an entire extent of the winding of the rotor coil.

7. The arrangement according to claim 1, wherein a radius of the winding of the stator coil comprises periodic fluctuations over an entire extent of the winding of the stator coil.

8. The arrangement according to claim 1, wherein a cross-section of the conductor that forms the winding of the rotor coil comprises periodic fluctuations over an entire extent of the winding of the rotor coil.

9. The arrangement according to claim 1, wherein a cross-section of the conductor that forms the winding of the stator coil comprises periodic fluctuations over an entire extent of the winding of the stator coil.

10. The arrangement according to over an entire extent of the winding of the rotor coil, a conductor that forms the winding of the rotor coil periodically comprises regions having a material with high magnetic permeability.

11. The arrangement according to over an entire extent of the winding, a conductor that forms the winding of the stator coil periodically comprises regions having a material with high magnetic permeability.

12. The arrangement according to claim 6, wherein a geometrical dimension of the stator coil is matched to a periodicity of structuring of the winding of the rotor coil.

13. The arrangement according to claim 12, wherein a diameter of the stator coil corresponds approximately to the fluctuations of a radius of the winding of the rotor coil.

14. The arrangement according to claim 7, wherein a geometrical dimension of the rotor coil is matched to a periodicity of structuring of the winding of the stator coil.

15. The arrangement according to claim 14, wherein a diameter of the rotor coil corresponds approximately to fluctuations of a radius of the winding of the stator coil.

* * * * *